United States Patent [19]

Murai et al.

[11] Patent Number: 4,903,208

[45] Date of Patent: Feb. 20, 1990

[54] POWER SOURCE FAILURE DETECTING SYSTEM FOR AUTOMOTIVE CONTROL SYSTEM

[75] Inventors: Takeshi Murai; Makoto Uko, both of Hiroshima, Japan

[73] Assignee: Mazda Motor Corporation, Hiroshima, Japan

[21] Appl. No.: 188,411

[22] Filed: Apr. 29, 1988

[30] Foreign Application Priority Data

May 1, 1987 [JP] Japan ............................ 62-106260

[51] Int. Cl.⁴ .................. G06F 15/20; G08B 19/00
[52] U.S. Cl. ........................ 364/424.05; 364/483; 340/663; 307/10.7
[58] Field of Search ............... 364/424.01, 424.05, 364/483, 550, 551.01; 320/41, 42; 180/233, 234; 307/10.1, 10.7; 340/663, 693

[56] References Cited

U.S. PATENT DOCUMENTS

| | | | |
|---|---|---|---|
| 3,979,657 | 9/1976 | Yorksie | 340/663 |
| 4,607,336 | 8/1986 | Morishita et al. | 364/483 |
| 4,608,639 | 8/1986 | Morishita et al. | 364/483 |
| 4,803,459 | 2/1989 | Ta | 340/693 |

*Primary Examiner*—Gary Chin
*Attorney, Agent, or Firm*—Sixbey, Friedman, Leedom & Ferguson

[57] ABSTRACT

A power source failure detecting system for detecting failure in a power source for an electronic control system for a vehicle determines that a failure occurs in the power source and outputs a signal when the vehicle speed continues to be higher than a predetermined value (e.g., 40 Km/h) for a predetermined time interval (e.g., 10 seconds) and at the same time, the power source voltage is lower than a predetermined value (e.g., 9 v).

11 Claims, 7 Drawing Sheets

POWER SOURCE FAILURE DETECTING SYSTEM FOR AUTOMOTIVE CONTROL SYSTEM

BACKGROUND OF THE INVENTION

1. Field of the Invention

This invention relates to a power source failure detecting system for automotive control systems such as for power train control, running control or the like.

2. Description of the Prior Art

There has been in wide use electronic control technics in vehicles due to remarkable improvement in performance of semiconductor devices such as a microcomputer. For example, an electronic engine control system for controlling emission and improving fuel economy, an electronic control system for controlling the driving system of a vehicle, an electronic control system for controlling behavior of a vehicle and the like have been put into practice. Further, also in a four-wheel steering system in which both the front wheel and the rear wheels are turned in response to operation of the steering wheel, a control system utilizing a microcomputer is used for controlling the rear wheel steering characteristics, e.g., the rear wheel turning angle ratio, i.e., the ratio of the rear wheel turning angle to the front wheel turning angle which may be changed according to various conditions such as the vehicle speed, the steering angle turning ratio or the like. Various methods of controlling the rear wheel steering characteristics in the four-wheel steering system are disclosed in U.S. Pat. No. 4,572,316, and Japanese Unexamined Patent Publication Nos. 59(1984)-128054 and 60(1985)-16369, for example.

In such electronic control systems for a vehicle, the mechanism-to-be-controlled is generally controlled to the safety side in case of failure of sensors, circuits or the like in the control system. Particularly, in mechanisms having an electronic circuit, the power source system must be stably operated in order for the electronic circuit to function normally. However, in the case of the automotive control devices, the power source system is mainly formed of a battery and an alternator, and includes unstable factors unlike the commercial power source, and accordingly, it is necessary to provide a power source failure detecting system for detecting failure of the power source system and to immediately control the mechanism-to-be-controlled to the safety side upon occurrence of failure in the power source system. However, it will be inconvenient if the power source failure detecting system is so oversensitive as to respond to a temporary failure of the power source which can soon be recovered.

SUMMARY OF THE INVENTION

In view of the foregoing observations and description, the primary object of the present invention is to provide a power source failure detecting system which can precisely detect occurrence of failure in the power source system for an automotive control system.

Figure 1:
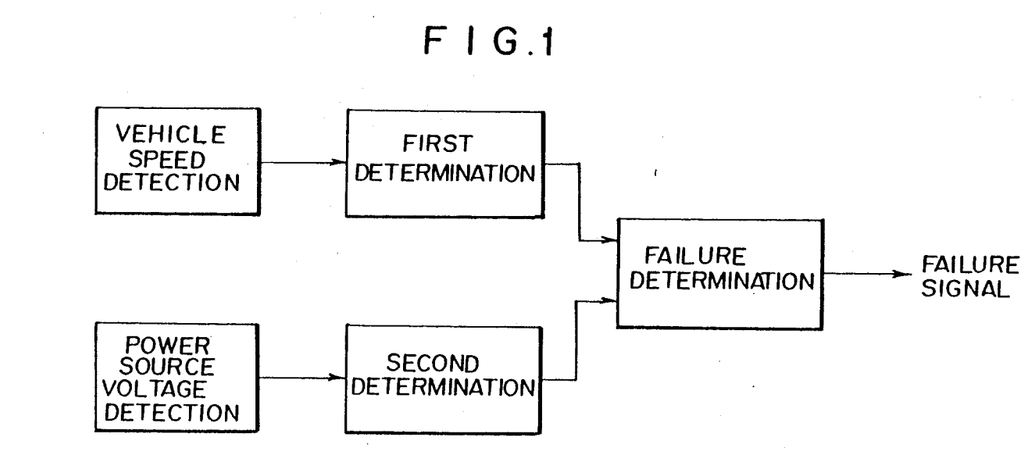
FIG. 1 is a block diagram showing the arrangement of the power source failure detecting system of the present invention.

As shown in FIG. 1, the power source failure detecting system in accordance with the present invention comprises a vehicle speed sensor, a first determining means which receives a singal from the vehicle speed sensor and generates a signal when the vehicle speed continues to be higher than a predetermined speed for a predetermined time interval, a power source voltage detecting means, a second determining means which receives a signal from the power source voltage detecting means and generates a signal when the power source voltage is lower than a predetermined value, and a failure determining means which determines that a failure occurs in the power source system when it receives signals from both the first and second determining means.

DESCRIPTION OF THE PREFERRED EMBODIMENT

Figure 2:
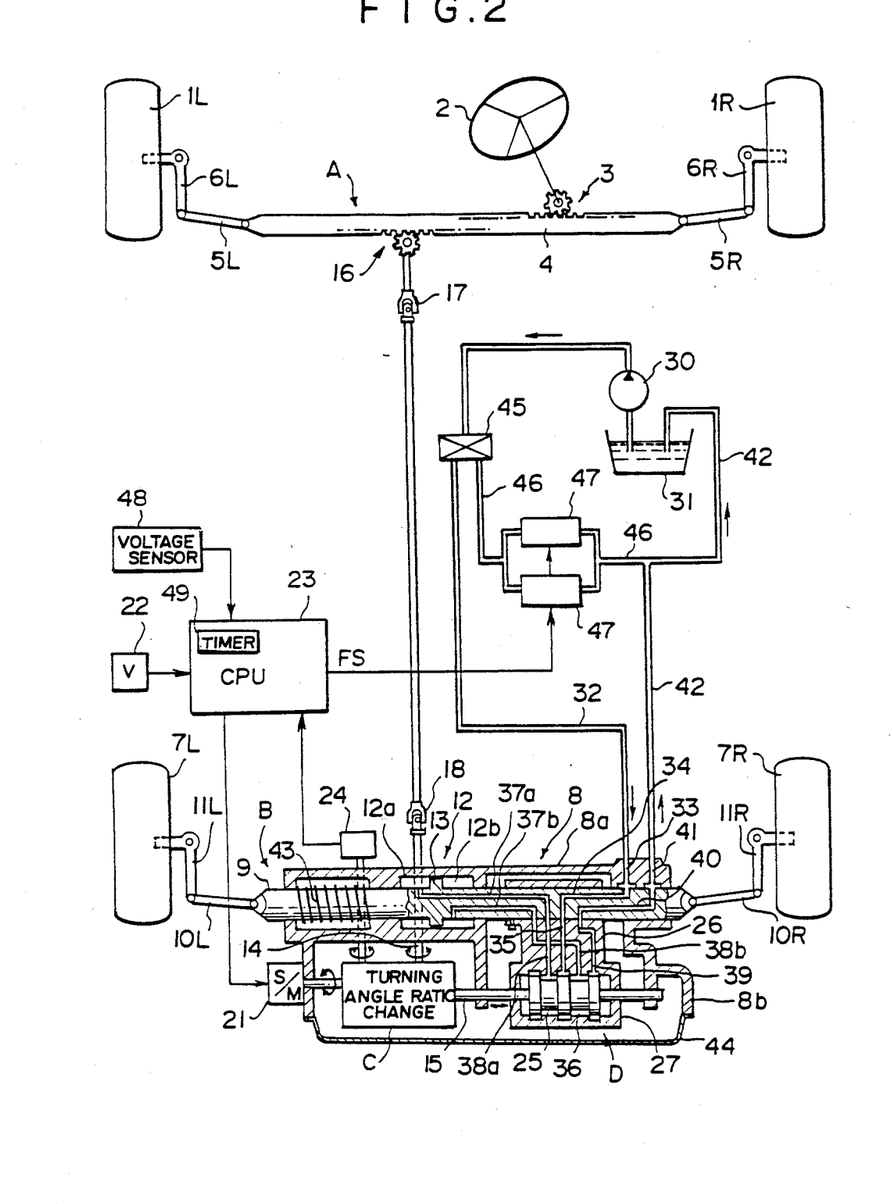
FIG. 2 is a schematic view showing a four-wheel steering system in which a power source failure detecting system in accordance with an embodiment of the present invention is employed.

In FIG. 2, a four-wheel steering system has a front wheel turning mechanism A for turning left and right front wheels 1L and 1R, and a rear wheel turning mechanism B for turning left and right rear wheels 7L and 7R. The front wheel turning mechanism a comprises a steering wheel 2, a rack-and-pinion mechanism 3, a front wheel turning rod 4 on which the rack of the rack-and-pinion mechanism 3 is formed, and left and right knuckle arms 6L and 6R which are respectively connected to left and right ends of the front wheel turning rod 4 by way of tie rods 5L and 5R.

The rear wheel turning mechanism B comprises a rear wheel turning rod 9 supported for sliding movement in the transverse direction of the vehicle body in a tubular casing 8a which forms a part of a housing 8, and left and right knuckle arms 11L and 11R which are respectively connected to left and right ends of the rear wheel turning rod 9 by way of tie rods 10L and 10R. The rear wheel turning rod 9 is provided with a power steering system. That is, the rod 9 extends through a power cylinder 12 formed integrally with the casing 8a, and a piston 13 is fixed to the rod 9 to divide the inside of the cylinder 12 into left and right hydraulic pressure chambers 12a and 12b. A rear wheel turning angle ratio changing mechanism C includes an input shaft 14 and a control rod (output shaft) 15. Movement of the front wheel turning rod 4 in the transverse direction of the vehicle body is converted, by a second rack-and-pinion mechanism 16, into revolution of a connecting rod 19 which is connected to the second rack-and-pinion mechanism 16 by way of a universal joint 17 and to the input shaft 14 of the rear wheel turning angle ratio changing mechanism C by way of a universal joint 18. The control rod 15 is movable in parallel to the rear wheel turning rod 9. To the rear wheel turning angle ratio changing mechanism C is connected a stepping motor 21 for changing the rear wheel turning angle ratio (the ratio of the rear wheel turning angle $c_R$ to the wheel turning angle $c_F$) according to the vehicle speed.

Figure 3:
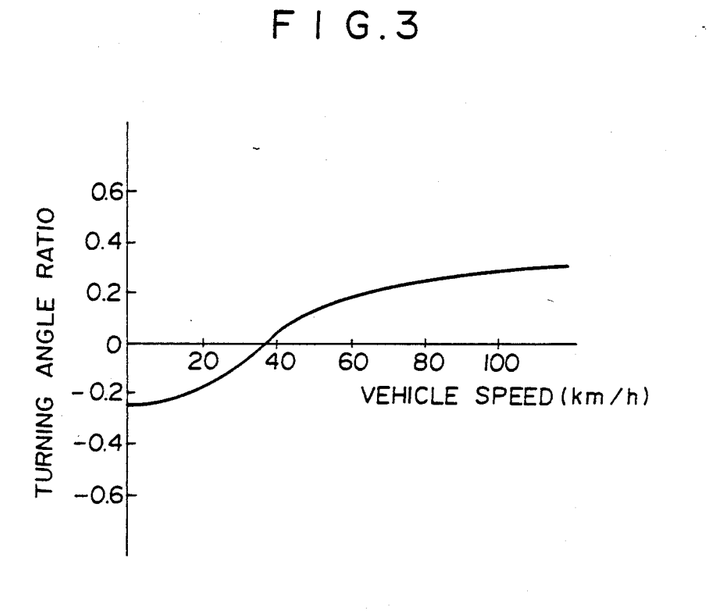
FIG. 3 is a view showing an example of the rear wheel steering characteristics.

The direction and the amount of rotation of the stepping motor 21 is controlled according to the vehicle speed by a control circuit (CPU) 23 which receives the output signal of a vehicle speed sensor 22. Though the structure and operation of the rear wheel turning angle ratio changing mechanism C will not be described in detail here since they have been disclosed, for instance, in Japanese Unexamined Patent Publication No. 59(1984)-48054, the direction and the amount of rotation of the stepping motor 21 determine the rear wheel turning direction and the rear wheel turning angle, and the rear wheel turning direction and the rear wheel turning angle are controlled as shown in FIG. 3, for example. In FIG. 3, when the rear wheels are turned in the direction reverse to the front wheel (reverse phase), the rear wheel turning ratio is defined to be negative, and when the rear wheels are turned in the same direction as the front wheels (same phase), the rear wheel turning angle ratio is defined to be positive. Accordingly, in accordance with the rear wheel steeing characteristics shown in FIG. 3, the rear wheels are turned in the direction reverse to the front wheels while the vehicle speed is lower than a predetermined value, about 35 Km/h, and when the vehicle speed is about 35 Km/h. the rear wheels are not turned irrespective of the front wheel turning angle (the rear wheel turning angle ratio is 0). Further, when the vehicle speed is higher than 35 Km/h, the rear wheels are turned in the same direction as the front wheels, and the rear wheel turning angle ratio is about +0.3 at 100 Km/h. Reference numeral 24 in FIG. 3 denotes a rear wheel turning angle ratio sensor the output of which is input into the control circuit 23 for feedback control of the stepping motor 21.

Figure 5:
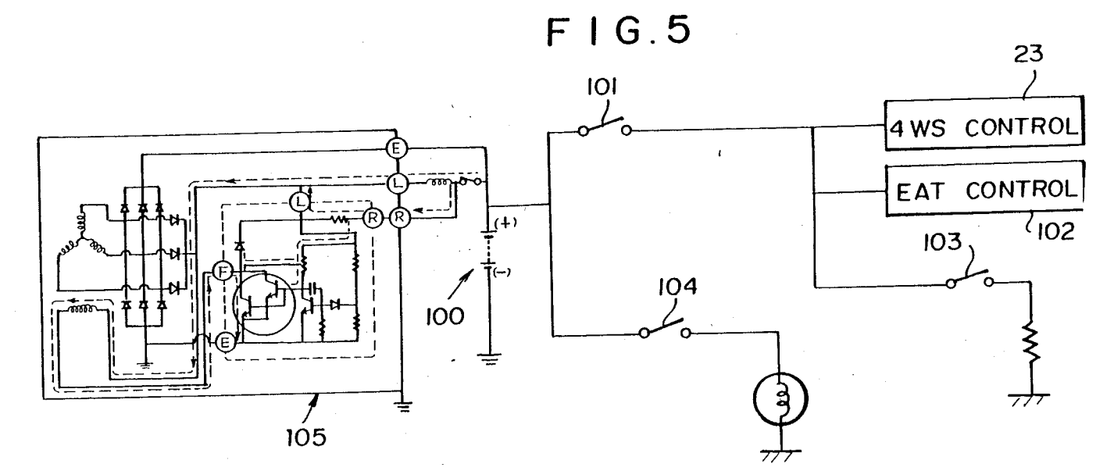
FIG. 5 is a block diagram showing a connection of the control system for the four-wheel steering system to the battery.

As shown in FIG. 5, the control circuit 23 is connected to a battery 100 by way of an ignition switch 101 in parallel to an automatic transmission control system 102 and a rear window defroster switch 103. In FIG. 5, reference numerals 104 and 105 respectively denote a head lamp switch and an alternator.

A hydraulic pressure control mechanism D for controlling the power cylinder 12 is accommodated, together with the rear wheel turning angle ratio changing mechanism C, in a casing 8b integrally formed with the tubular casing 8a. The hydraulic pressure control mechanism D includes a spool valve 25 for switching hydraulic lines. The spool valve 25 is provided for sliding motion in a valve housing 27 fixed to the rear wheel turning rod 9 by way of a connecting portion 26. Further, the spool valve 25 is formed on an extension of the control rod 15 of the rear wheel turning angle ratio changing mechanism C, and is movable in the transverse direction of the vehicle body in parallel to the rear wheel turning rod 9. In order to introduce oil into the valve housing 27 and the hydraulic pressure chambers 12a and 12b of the power cylinder 12, hydraulic lines are formed in the housing 8a, the rear wheel turning rod 9 and the connecting portion 9 in the following manner. Hydraulic oil in an oil reservoir 31 is introduced by an oil pump 30 into a hydraulic line 33 formed in the casing 8a by way of an oil filter 45 and a hydraulic line 32 and into a hydraulic oil chamber 36 in the valve housing 27 by way of hydraulic lines 34 and 35 respectively formed in the rear wheel turning rod 9 and the connecting portion 26. The hydraulic pressure chambers 12a and 12b are communicated with the hydraulic oil chamber 36 respectively by way of a hydraulic line 37a in the rear wheel turning rod 9 and a hydraulic line 38a in the connecting portion 26 and by way of a hydraulic line 37b in the rear wheel turning rod 9 and a hydraulic line 38b in the connecting portion 26. The hydraulic oil in the hydraulic oil chamber 36 returns to the oil reservoir 31 by way of hydraulic lines 39, 40 and 41 respectively formed in the connecting portion 26, the rear wheel turning rod 9 and the casing 8a and by way of a hydraulic line 42. With this arrangement, the rear wheel turning rod 9 is moved left and right in response to movement of the control rod 15 of the rear wheel turning angle ratio changing mechanism C. Reference numeral 43 denotes a centering spool for returning the rear wheel turning rod 9 to the neutral position when the hydraulic pressure in the power cylinder 12 is cut. An oil pan 44 is mounted on the lower side of the casing 8b and oil in the oil pan 44 lubricates the mechanical parts.

A bypass hydraulic line 46 communicates the oil filter 45 with the hydraulic line 42 bypassing the hydraulic line 32. The bypass hydraulic line 46 is provided with a pair of solenoid valves 47 connected in parallel to each other. The solenoid valves 47 normally close the bypass hydraulic line 46. For the purpose of safety, two solenoid valves 47 are provided as will become apparent later.

Figure 4A:
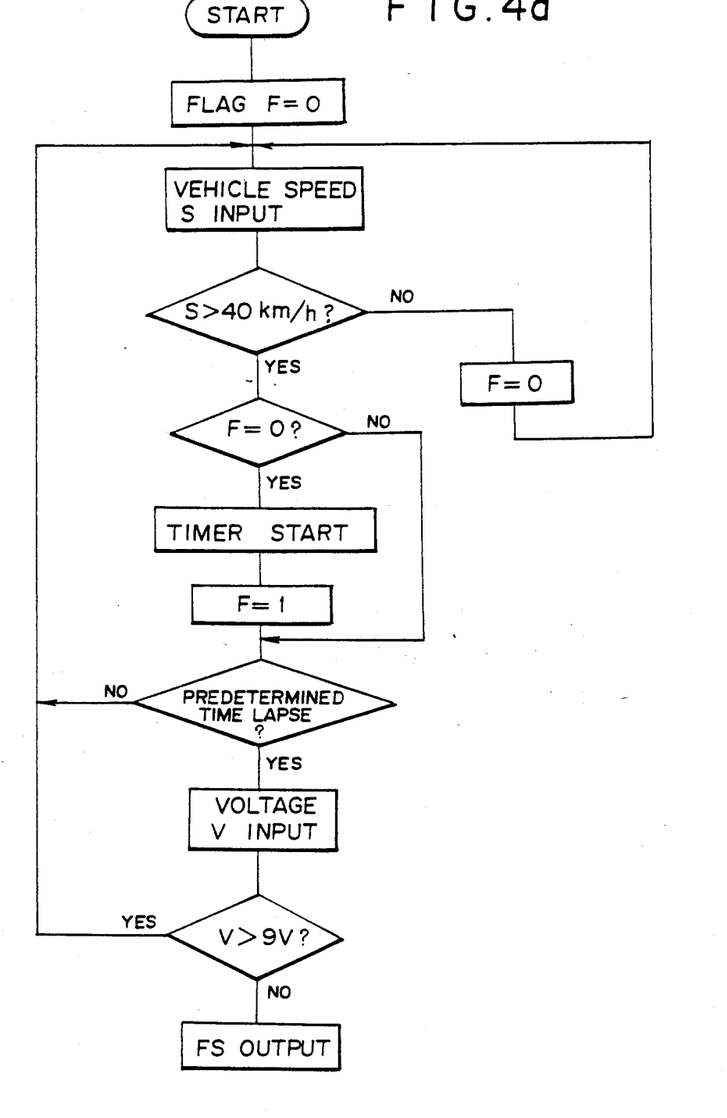
FIGS. 4a and 4b are flow charts for illustrating the operation of the failure detecting system.
Figure 4B:
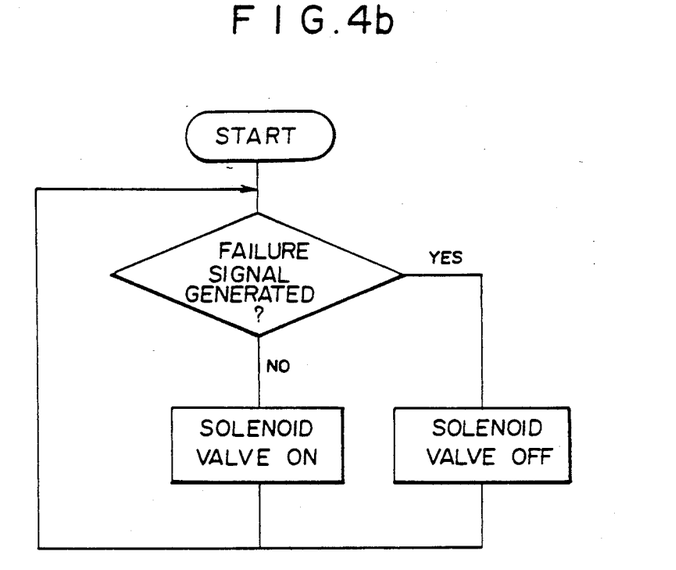

An output of a power source voltage sensor 48 is input into the control circuit 23. The control circuit 23 is provided with a timer 49. As can be understood from the flow charts shown in FIGS. 4a and 4b, when the vehicle speed is higher than a predetermined value (e.g., 40 Km/h) for a predetermined time interval (e.g, 10 seconds) and at the same time, the power source voltage is lower than a predetermined value (e.g., 9 v), the control circuit 23 outputs a failure signal FS to drive the solenoid valves 47 to open the bypass hydraulic line 46. When the bypass hydraulic line 46 is opened, the hydraulic pressure in the power cylinder 12 is cut and the rear wheel turning rod 9 is to the neutral position under the force of the centering spring 43. Thus, the rear wheels 7L and 7R are returned to the straight-ahead position and held there independently from the steering wheel or the front wheels. That is, a fail-safe mechanism is operated.

Figure 6A:
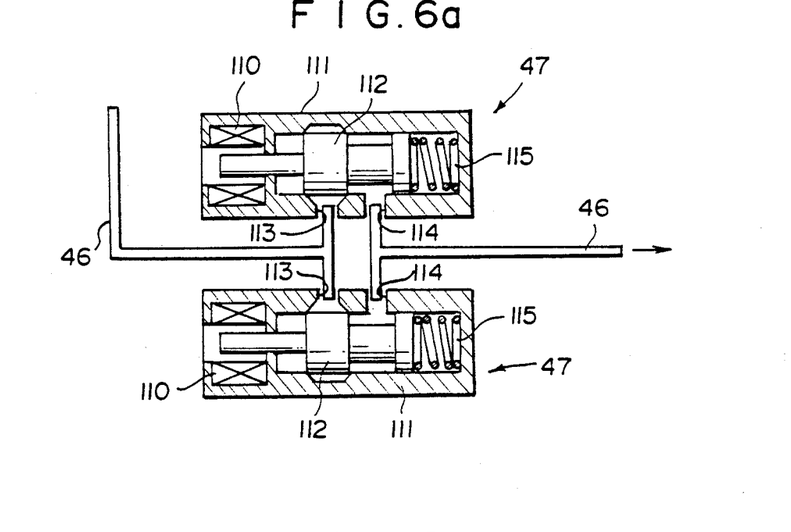
FIGS. 6a and 6b are enlarged views for illustrating the operation of the solenoid valves employed in the hydraulic system of the four-wheel steering system.
Figure 6B:
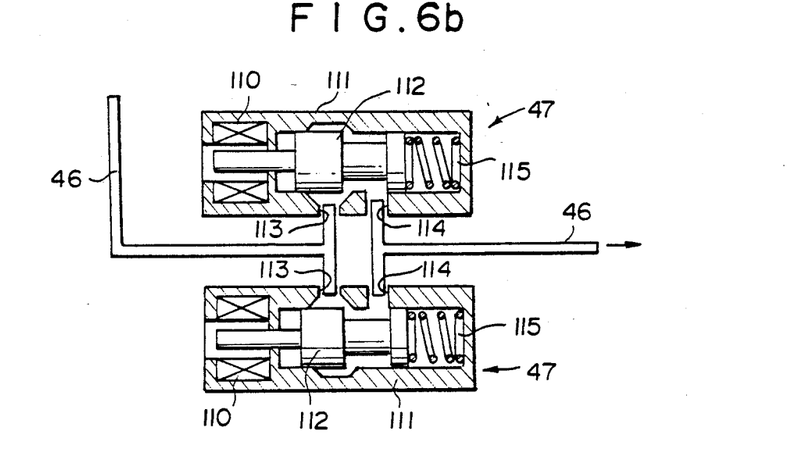

As shown in FIG. 6, each of the solenoid valves 47 comprises a solenoid 110 fixedly held in a housing 111 and a spool valve body 112 slidably held in the housing 111. The housing 111 is provided with an oil inlet 113 and an oil outlet 114 respectively connected to the upstream side portion of the bypass hydraulic line 46 and the downstream side portion of the same. The spool valve body 112 is normally urged by a spring 115 in the closing position shown in FIG. 6a in which it breaks communication between the oil inlet 113 and the oil outlet 114, and when the solenoid 110 is energized, the spool valve body 112 is moved to the opening position shown in FIG. 6 in which it permits communication between the oil inlet 113 and 114, thereby opening the bypass hydraulic line 46.

By adding the condition that the vehicle speed is continuously higher than 40 Km/h for 10 seconds to the condition that the power source voltage is lower than 9 volts as the condition for generating the failure singla, the fail-safe mechanism can be prevented from being operated by a temporary voltage drop of the power source which can be recovered when the vehicle speed higher than 40 Km/h is maintained for 10 seconds so long as the battery and the alternator are normal.

Though, in the embodiment described above, the solenoid valves 47 are operated to hydraulically hold the rear wheels 7L and 7R when the failure signal FS is generated, the stepping motor 21 may be driven to make the rear wheel turning angle ratio of zero upon generation of the failure signal FS. Of course, the stepping motor 21 may be operated in the manner described above in addition to operation of the solenoid valves 47, thereby further improving safety.

Though the power source failure detecting system of the present invention has been described in conjunction with the four-wheel steering system, the system of the present invention may be applied to other control systems for a vehicle.

We claim:

1. A power source failure detecting system for detecting failure in a power source system for an automotive control system, comprising a vehicle speed sensor, a first determining means which receives a signal from the vehicle speed sensor and generates a signal when the vehicle speed continues to be higher than a predetermined speed for a predetermined time interval, a power source voltage detecting means, a second determining means which receives a signal from the power source voltage detecting means and generates a signal when the power source voltage is lower than a predetermined value, and a failure determining means which determines that a failure occurs in the power source system when it receives signals from both the first and second determining means.

2. A power source failure detecting system as defined in claim 1 in which said automotive control system comprises a four-wheel steering system for turning the rear wheels of the vehicle according to the vehicle speed and the turning angle of the front wheels said four-wheel steering system further including means for controlling turning of the rear wheels in response to said failure determining means determining the occurrence of a failure in the power source system.

3. A power source failure detecting system as defined in claim 2 in which the rear wheels are turned by a rear wheel turning mechanism having a power steering mechanism operated by hydraulic pressure delivered from an oil pump driven by the engine of the vehicle.

4. A power source failure detecting system as defined in claim 3 in which said means for controlling turning includes solenoid valve means for cutting hydraulic pressure to be delivered to the power steering mechanism when said failure determining means determines that a failure occurs in the power source system.

5. A power source failure detecting system as defined in claim 4 in which said power steering mechanism is connected with said oil pump by way of a hydraulic pressure line and a drain line and said solenoid valve is provided in a bypass line which is connected between the hydraulic pressure line and the drain line bypassing the power steering mechanism.

6. A power source failure detecting system as defined in claim 4 in which said four-wheel steering system includes a pair of solenoid valves which are connected in parallel to each other and which cut hydraulic pressure to be delivered to the power steering mechanism when said failure determining means determines that a failure occurs in the power source system.

7. A power source failure detecting system as defined in claim 4 in which said power steering mechanism is provided with a return spring for returning the rar wheels to the straight-ahead position when the hydraulic pressure to be delivered to the power steering mechanism is cut.

8. A power source failure detecting system as defined in claim 2 in which said four-wheel steering system turns the rear wheels of the vehicle according to the vehicle speed detected by said vehicle speed sensor.

9. A power source failure detecting system as defined in claim 1 in which said power source voltage is supplied from a battery which is charged by an alternator driven by the engine of the vehicle.

10. A power source failure detecting system as defined in claim 9 in which a plurality of electric loads are connected to the battery.

11. A power source failure detecting system as defined in claim 10 in which at least one of the electric loads is manually operated.

* * * * *